US010659978B1

(12) United States Patent
Marupaduga et al.

(10) Patent No.: US 10,659,978 B1
(45) Date of Patent: May 19, 2020

(54) USE OF UE TYPE AS BASIS TO CONTROL WHETHER TO USE BLIND ADDITION OR RATHER THRESHOLD-BASED ADDITION WHEN CONFIGURING DUAL CONNECTIVITY

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/549,681

(22) Filed: Aug. 23, 2019

(51) Int. Cl.
*H04W 24/02* (2009.01)
*H04W 24/10* (2009.01)
*H04W 88/04* (2009.01)
*H04W 88/06* (2009.01)

(52) U.S. Cl.
CPC ........... *H04W 24/02* (2013.01); *H04W 24/10* (2013.01); *H04W 88/04* (2013.01); *H04W 88/06* (2013.01)

(58) Field of Classification Search
CPC ..... H04W 24/02; H04W 24/10; H04W 88/06; H04W 88/04
See application file for complete search history.

(56) References Cited

U.S. PATENT DOCUMENTS

| 9,900,925 | B2 | 2/2018 | Fujishiro et al. | |
|---|---|---|---|---|
| 10,149,170 | B2* | 12/2018 | Youn | H04W 16/04 |
| 2012/0190395 | A1* | 7/2012 | Pan | H04L 5/001 455/509 |
| 2014/0064146 | A1* | 3/2014 | Wang | H04W 36/0083 370/254 |
| 2015/0319655 | A1* | 11/2015 | Koskinen | H04W 24/10 370/331 |
| 2017/0202003 | A1* | 7/2017 | Johansson | H04W 24/10 |
| 2017/0332301 | A1* | 11/2017 | Horn | H04W 36/18 |
| 2018/0279218 | A1* | 9/2018 | Park | H04W 48/20 |
| 2019/0037625 | A1* | 1/2019 | Shih | H04W 76/15 |

* cited by examiner

*Primary Examiner* — Nizar N Sivji

(57) ABSTRACT

A mechanism for controlling configuration of dual connectivity for a UE that has a first connection with a first access node. The first access node could make a determination what type of UE the UE is, such as whether the UE is a relay-UE or rather an end-user UE for instance. Based on the determined type, the first access node could then control whether to apply blind addition or rather threshold-based addition in adding for the UE a second connection with a second access node. For instance, if the UE is an end-user UE rather than a relay-UE, then the first access node could apply blind addition rather than threshold-based addition, and if the UE is a relay-UE rather than an end-user UE, then the first access node could apply threshold-based addition rather than blind addition.

17 Claims, 4 Drawing Sheets

USE OF UE TYPE AS BASIS TO CONTROL WHETHER TO USE BLIND ADDITION OR RATHER THRESHOLD-BASED ADDITION WHEN CONFIGURING DUAL CONNECTIVITY

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of a user-plane bearer, including an access-bearer that extends between the access node and a core-network gateway system providing connectivity with a transport network and a data-radio-bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs, and the UE could responsively transmit the data to the access node in those PRBs.

In practice, the UE could also regularly evaluate the quality (e.g., based on reference-strength) of its coverage from its serving access node and could transmit an associated channel quality indicator (QCI), which the access node could use as a basis to set a modulation and coding scheme (MCS) to be used for downlink and uplink the air-interface communication between the access node and the UE. Higher quality coverage could correspond with a higher-order MCS, which could allow use of fewer air-interface resources (e.g., PRBs) to communicate given bearer data, whereas lower quality coverage could correspond with a lower-order MCS, which could require use of more air-interface resources to communicate given bearer data.

Further, for both the downlink and uplink air-interface communication, if the receiving end does not successfully receive a scheduled data communication from the transmitting end (which might happen if coverage conditions are relatively poor), the receiving end could responsively send to the transmitting end a negative acknowledgement (NACK), and the transmitting end could then responsively engage in re-transmission using air-interface resources of an upcoming subframe.

As the industry advances from one generation of RAT to the next, networks and UEs may be configured to support service on multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB)) concurrently with the 5G radio being served by a 5G access node (next generation Node-B (gNB)). This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just 4G LTE for instance.

In some dual-connectivity arrangements, an access node operating under a first RAT could serve as a master node (MN), responsible for RRC signaling with the UE, responsible for coordinating setup and teardown of dual-connectivity service for the UE, and functioning as an anchor point for core-network control signaling related to the dual-connected UE. And an access node operating under a second RAT could serve as a secondary node (SN), to provide increased data capacity for the UE for instance. With EN-DC, for example, a 4G eNB could operate as the MN (referred to as an MeNB), and a 5G gNB could operate as the SN (referred to as an SgNB).

These access nodes could be collocated in a common cell site, possibly sharing an antenna tower, and could be configured to provide coverage in generally the same direction and of generally the same scope as each other. Alternatively, the access nodes could be at separate cell sites but still configured to provide substantially overlapping or coterminous coverage.

When the UE enters into coverage of such a system, the UE could initially scan for coverage under the first RAT and discover threshold strong coverage of the MN, and the UE could responsively engage in signaling as discussed above to establish for the UE an RRC connection. Further, the UE could engage in attach signaling with a core-network controller, via the UE's established RRC connection, and the core-network controller and MN could coordinate establishment for the UE of an access bearer and DRB as noted above. Here, the DRB and/or other service parameters that the MN configures to support the MN's air-interface service of the UE could define for the UE a first-RAT connection.

The MN could then serve the UE in a first-RAT standalone mode (i.e., under just the first RAT) with packet-data communications as described above. For instance, when the core network has data to send to the UE, the data could flow to the MN, and the MN could schedule and provide transmission of the data on downlink PRBs to the UE, with the UE monitoring for scheduling directives and reading the data from the downlink PRBs. And when the UE has data to send, the UE could transmit a scheduling directive to the MN, the MN could schedule transmission of the data on uplink PRBs from the UE, and the UE could monitor for scheduling directives and transmit the data on the scheduled uplink PRBs.

In addition, once the UE is connected with the MN, the MN could engage in a process to coordinate setup of dual-connectivity for the UE, so that the UE can be served concurrently by the MN and the SN.

To do so, the MN could first engage in an SN-addition process to add for the UE a second-RAT connection with the SN, so that the MN and SN can then cooperatively provide the UE with dual-connectivity service over their respective connections with the UE. In an example implementation, for instance, the MN could transmit to the SN an SN-addition request message, providing RRC and DRB configuration information and other information for the second-RAT connection, and the SN could then responsively allocate resources for the second-RAT connection and reply to the MN an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then engage in random-access signaling with the SN so as to complete establishment of the second-RAT connection for the UE.

Further, for some dual-connectivity implementations, the MN could also engage in signaling process to transfer the UE's access-bearer from being between the gateway system and the MN to instead being between the gateway system and the SN. For instance, the MN could include in its SN-addition request to the SN information about the access bearer, and the MN could transmit to the core-network controller an access-bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's second-RAT connection to the UE, and the SN could send another portion of the data to the MN, which the MN could transmit to the UE over the UE's first-RAT connection. Likewise, when the UE has data to transmit, the UE could transmit a portion of the data over the UE's first-RAT connection to the MN, which the MN could forward to the SN and the SN could transmit over the UE's access bearer to the gateway system, and the UE could transmit another portion of the data over the UE's second-RAT connection to the SN, which the SN could transmit over the UE's access bearer to the gateway system.

While the above process of configuring dual-connectivity for a UE may work well practice, one technical issue with the process is how the MN would determine in the first place that the second-RAT connection with the SN should be established for the UE, and thus that the MN should engage in the SN-addition process to configure that second-RAT connection for the UE.

Here, the MN may have a choice of at least two different processes to apply. One option, referred to as "blind addition," involves the MN adding the second-RAT connection without requiring as a condition precedent that the UE report being within threshold strong coverage of the SN. And the other option, referred to as "threshold-based addition," involves the MN adding the second-RAT connection if and only if the UE reports being within threshold strong coverage of the SN, i.e., contingent on the UE reporting being within threshold strong coverage of the SN.

With blind addition, the MN could simply proceed to add the second-RAT connection for the UE (e.g., engage in signaling to facilitate that addition), on possible grounds that the MN and SN provide coverage of generally the same direction and scope as each other so that, if the UE is within sufficiently strong coverage of the MN, the UE is likely also within sufficiently strong coverage of the SN. Whereas, with threshold-based addition, the MN could transmit to the UE a measurement object that would cause the UE to report to the MN if and when the UE detects at threshold strong coverage of the SN under the second-RAT, and the MN would proceed to add the second-RAT connection for the UE if and when the UE provides that measurement report.

Disclosed herein is a mechanism to control which SN-addition process an MN will use in a given instance, such as to control whether the MN will apply the blind-addition process or rather the threshold-based-addition process.

In accordance with the disclosure, when the MN is going to configure dual-connectivity for a UE, the MN will select between applying the blind-addition process and applying the threshold-based-addition process, with the selection being based at least on what type of UE the UE is. In particular, the MN could base the selection on a consideration of the extent to which somewhat poor coverage of the SN would pose an issue with respect to service provided to that type of UE.

At issue here could be whether or not the UE is a type that operates to provide connectivity for one or more other UEs or is rather an end-user UE that does not operate to provide connectivity for one or more other UEs. Examples of a UE that operates to provide connectivity for one or more other UEs are (i) a relay-UE that operates to provide connectivity for a relay base station that would in turn serve one or more end-user UEs and (ii) a mobile hotspot UE (e.g., a dedicated hotspot device) that operates to provide connectivity for one or more end-user-UEs, among others. For simplicity, any such UEs that operate to provide connectivity for one or more other UEs could be referred to as relay-UEs, whereas a UE that does not operate to provide connectivity for one or more other UEs could be referred to as an end-user UE.

If the UE is a relay-UE rather than an end-user UE, then having somewhat poor coverage of the SN may be especially problematic, because the poor coverage could result in low-order MCS of communications between the SN and UE and could result in repeated retransmissions, both of which could negatively impact both user-plane and control-plane communications as to one or more other UEs for which the UE provides connectivity. Therefore, if the UE is a relay-UE rather than an end-user UE, then the MN could apply the threshold-based-addition process to help ensure that the UE is within strong enough coverage of the SN before the MN seeks to add for the UE a secondary connection with the SN.

Whereas, if the UE is an end-user UE rather than a relay-UE, then, although having somewhat poor coverage of the SN may negatively impact communications between the SN and the UE itself, there would be UEs connected through the UE that could be impacted as a result. Therefore, if the UE is an end-user UE rather than a relay-UE, then, in adding for the UE a secondary connection with the SN, the MN could apply the blind-addition process rather than the threshold-based-addition process.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE service, 5G NR service, and EN-DC service. However, it should be understood that the disclosed principles could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
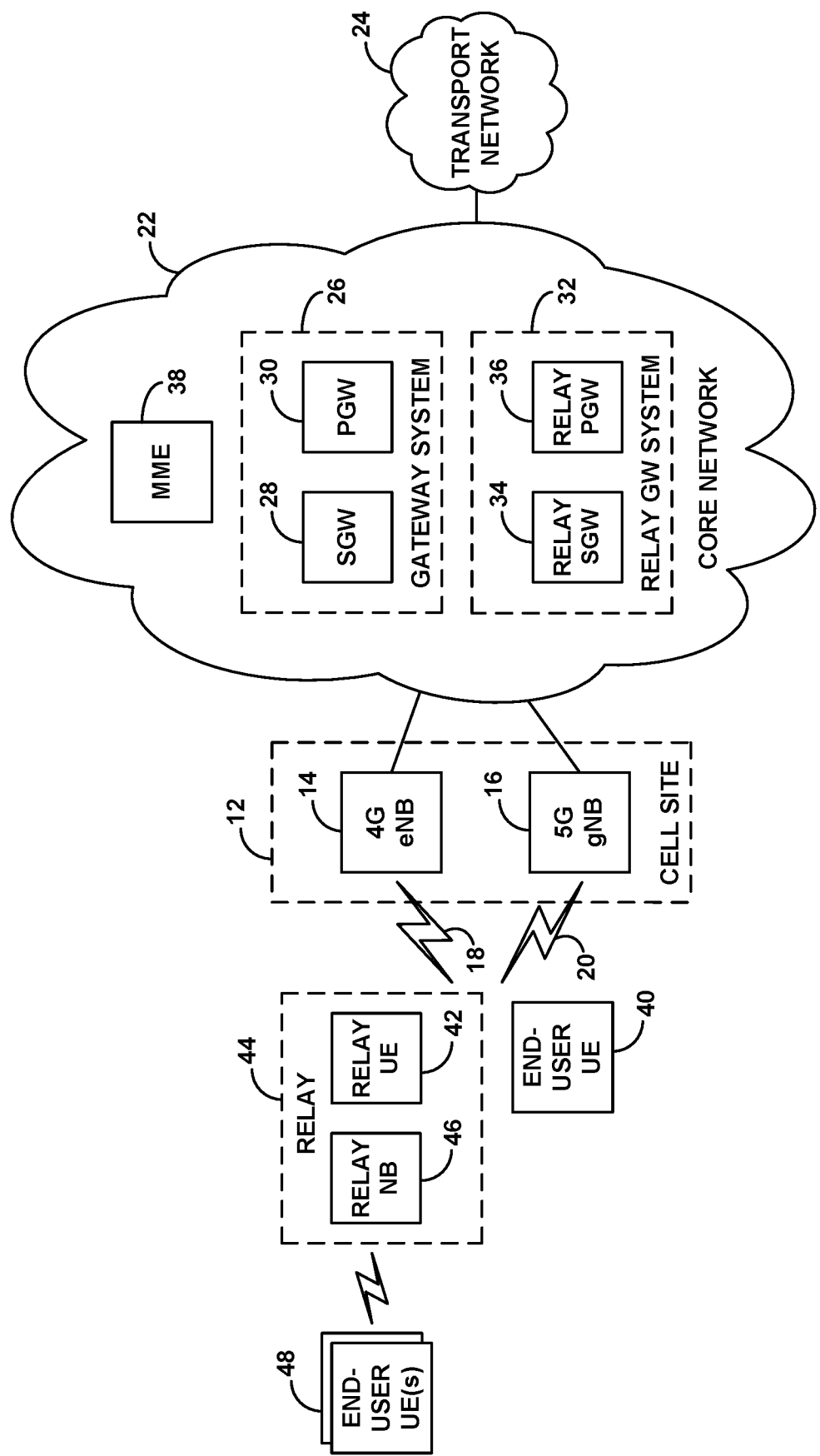
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage.

Each access node could have a respective antenna structure that is configured to transmit and receive electromagnetic signals in a region defined by an antenna pattern or radiation pattern. The antenna pattern defines a scope of coverage in which the access node can engage in downlink transmission to UEs and receive uplink transmission from UEs. In particular, the antenna pattern may define a main lobe and could be characterized by an azimuth angle, an elevation angle, and a beamwidth. In polar coordinates, the azimuth angle defines a direction of radiation of the main lobe within a horizontal plane, as an angle of rotation around a vertical axis (in relation to North (zero degrees) for instance), the elevation angle defines a direction of radiation of the main lobe within a vertical plane, as an angle of rotation around a horizontal axis (in relation to the horizon for instance), and the beamwidth defines an angular width of the main lobe within the horizontal plane, typically measured between half-power (−3 dB) points of the main lobe for instance.

In practice, the antenna structures of the access nodes could be collocated with each other, such as by being mounted on a common antenna tower and/or being in a common housing. Further, the azimuth angle, elevation angle, and beamwidth of either or each access node's antenna pattern could be structured so that the two access nodes provide coverage of the same or similar direction and scope as each other, i.e., largely coterminous coverage, even though the access nodes may be operating on different frequencies with different path loss than each other. There could also be some variation between the access nodes' respective coverage areas.

Each access node could provide coverage on one or more carriers according to a respective radio access technology. For instance, the 4G eNB 14 could provide 4G coverage 18 on one or more 4G carriers, and the 5G eNB 16 could provide 5G coverage 20 on one or more 5G carriers.

In an example implementation, the respective coverage on each carrier could be divided over time into frames, subframes, timeslots, and symbol segments, and could be divided over carrier frequency bandwidth into subcarriers. As a result, the respective coverage could define an array of time-frequency resource elements, in which subcarriers can be modulated to carry data communications. Further, in each subframe, these resource elements could be divided into groups defining the PRBs noted above, which could be allocable by the associated access node on an as-needed basis to carry data communications as noted above. And certain resource elements per subframe could be reserved for other purposes as further discussed above.

The 4G air interface and 4G service provided by 4G eNB 14 could differ from the 5G air interface and 5G service provided by the 5G gNB 16 in various ways now known or later developed. For example, one may provide variable subcarrier spacing, and the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example arrangement of FIG. 1, the 4G eNB 14 and 5G gNB 16 are both interfaced with a core network 22, which could be an evolved packet core (EPC) network, a next generation core (NGC) network, or another network including components that may provide connectivity with at least one transport network 24, such as the Internet. In an example implementation as shown, the core network includes a gateway system 26, having a serving gateway (SGW) 28 and a packet-data network gateway (PGW) 30, which provides user-plane connectivity with the transport network 24. Further, the core network includes a relay-gateway system 32, having a relay-SGW 34 and a relay-PGW 36, which provides internal-core-network connectivity to facilitate communicating with other core-network entities. And the core network is also shown including a mobility management entity (MME) 38, which serves as a core-network controller. Other core-network arrangements are also possible.

FIG. 1 also illustrates two example UEs 40, 42 within coverage of both the 4G eNB 14 and the 5G gNB 16. Each of these UEs could be equipped with a 4G LTE radio, a 5G NR radio, and associated circuitry and logic that enables the UE to engage in 4G LTE service, 5G NR service, and EN-DC service.

As shown, UE 40 is an end-user UE that does not operate to provide connectivity for one or more other UEs. For instance, UE 40 might be a cell phone, tablet computer, gaming device, machine-type-communication device, tracking device, embedded wireless module, or other wirelessly equipped communication device. (In practice, UE 40 might be a smart phone or the like that includes hotspot functionality as well, but for present purposes that UE would be an end-user UE rather than a relay-UE, since UE does not operate as a dedicated mobile hotspot.)

When UE 40 initially enters into coverage of the illustrated network, UE 40 could discover coverage of the 4G eNB 14, such as by scanning predefined 4G carriers to find a synchronization signal from the 4G eNB 14 and then determining that a reference signal from the 4G eNB 14 is strong enough to justify connecting. The UE 40 could then engage in random-access signaling and RRC signaling with the 4G eNB 14 to establish an RRC connection, and the 4G eNB 14 could establish a context record indicating the state of the UE's 4G connection and service.

With its RRC connection established, the UE 40 could then transmit to the 4G eNB 14 an attach request message, which the 4G eNB 14 could forward to the MME 38 for processing. And upon authenticating and authorizing the UE 40 for service, the MME 38 and 4G eNB 14 could coordinate setup for the UE 40 of at least one user-plane bearer. In particular, the MME 38 could engage in signaling with the 4G eNB 14 and the SGW 28 to coordinate setup for the UE 40 of an S1-U packet tunnel between the 4G eNB 14 and the SGW 30, and the SGW 28 could responsively engage in signaling with the PGW 30 to coordinate setup for the UE 40 of an associated S5 packet tunnel between the SGW 28 and the PGW 30. Further, the 4G eNB 14 could engage in signaling with the UE 40 to establish a DRB and other configuration parameters cooperatively defining a 4G connection for the UE 40.

Once UE 40 is so connected and attached, the 4G eNB 14 could then serve the UE 40 in a standalone-4G mode, as discussed above.

UE 42, on the other hand, is shown as a relay-UE, which operates to provide connectivity for one or more other UEs. By way of example, the figure illustrates relay-UE 42 being part of a relay 44 that also includes a relay access-node 46 (e.g., relay Node-B (NB)). With this arrangement, the relay-UE 42 could connect with and be served by one or more donor NBs such as the 4G eNB 14 and/or the 5G gNB 16, and the relay-UE could be interconnected through a wired or wireless interface with the relay access node 46 that could serve one or more other UEs 48 in much the same way as a conventional access node would, as discussed above for instance.

When relay-UE 42 initially enters into coverage of the illustrated network, UE 40 could discover coverage of the 4G eNB 14, such as by scanning predefined 4G carriers to find a synchronization signal from the 4G eNB 14 and then determining that a reference signal from the 4G eNB 14 is strong enough to justify connecting. The relay-UE 42 could then engage in random-access signaling and RRC signaling with the 4G eNB 14 to establish an RRC connection, and the 4G eNB 14 could similarly establish a context record indicating the state of the UE's 4G connection and service.

As part of this signaling, the relay-UE 42 could convey to the 4G eNB 14 an indication that the UE 42 is a relay-UE rather than an end-user UE. For instance, the UE-relay 42 might transmit a special public land mobile network (PLMN) identifier that correlates with the UE 42 being a UE-relay. The 4G eNB 14 could thereby determine from that indication or in another manner that the UE 42 is a relay-UE rather than an end-user UE and could accordingly record that fact in its context record for the relay-UE 42.

With its RRC connection established, the relay-UE 43 could then similarly transmit to the 4G eNB 14 an attach request message, which the 4G eNB 14 could forward to the MME 38 for processing. This attach request may also include an indication that the UE is a relay-UE (e.g., rather than an end-user UE). Therefore, upon authenticating and authorizing the relay-UE 42 for service, the MME 38 and 4G eNB 14 could coordinate setup for the relay-UE 42 of at least one user-plane bearer with the relay-gateway system 32 rather than with the conventional gateway system 26. For instance, the MME 38 could engage in signaling with the 4G eNB 14 and the relay-SGW 34 to coordinate setup for the relay-UE 42 of an S1-U packet tunnel between the 4G eNB 14 and the relay-SGW 34, and the relay-SGW 34 could responsively engage in signaling with the relay-PGW 36 to coordinate setup for the relay-UE 42 of an associated S5 packet tunnel between the relay-SGW 34 and the relay-PGW 36. Further, the 4G eNB 14 could engage in signaling with the relay-UE 42 to establish a DRB and other configuration parameters cooperatively defining a 4G connection for the relay-UE 42.

Once the relay-UE 42 is connected and attached, the 4G eNB 14 could then similarly serve the relay 42 in a standalone-4G mode in the manner discussed above, and the 4G connection and access-bearer established for relay-UE 42 could function as a relay backhaul interface through which relay-NB 46 could communicate on core network 22 as though relay-NB 48 had been directly connected with the core network 22.

Thus, with this arrangement, one or more end-user UEs 48 could connect with relay-NB and attach with the network. And user-plane communications between those end-user UEs 48 and the gateway system 26 could then flow via the relay-NB 46, the relay-UE 42, the 4G connection between the relay-42 and the 4G eNB 14 and the relay-UE's access-bearer between the 4G eNB 14 and the relay-PGW 36. Further, associated control signaling between relay-NB 46 and the core network 22 (e.g., signaling with MME 38) could likewise flow via the relay-UE 42, the 4G connection between the relay-42 and the 4G eNB 14 and the relay-UE's access-bearer between the 4G eNB 14 and the relay-PGW 36.

For each of these UEs 40, 42, as a last step of the attachment process, the 4G eNB 14 could also transmit to the UE an RRC message carrying a UE-capability enquiry, and the UE could respond to the 4G eNB 14 with a "UE capability information" information element (IE), which could indicate that the UE is EN-DC capable. Alternatively, the 4G eNB 14 could discover in another manner that the UE is EN-DC capable.

For each such UE, the 4G eNB 14 could then work to configure EN-DC service for the UE. In line with the discussion above, for instance, the 4G eNB 14, operating as MeNB, could first engage in process to add the 5G gNB 16 as an SgNB for the UE, such as by transmitting to the 5G gNB 16 an SgNB-Addition request to cause the 5G gNB to allocate resources for a 5G connection for the UE on one or more 5G carriers, receiving an SgNB-Addition-Request acknowledge message from the 5G gNB 16, and engaging in associated RRC signaling with the UE, in response to which the UE could then access and complete establishment of the 5G connection. Further, the 4G eNB 14 could engage in signaling as described above to transfer to the UE's access bearer to the 5G gNB as well.

The 4G eNB 14 and 5G gNB 16 could then provide the UE with EN-DC service, concurrently serving the UE over their respective connections with the UE. Namely, the 4G eNB 14 could allocate PRBs of its 4G air interface as needed to carry data over the 4G connection between the 4G eNB 14 and the UE, and the 5G gNB could allocate PRBs of its 5G air interface as needed to carry data over the 5G connection between the 5G gNB 16 and the UE.

In accordance with the present disclosure, as discussed above, the 4G eNB 14 could operate in either of at least two modes with respect to adding the 5G gNB 16 as a secondary node for providing EN-DC service for a UE: (i) a blind-addition-mode or (ii) a threshold-based-addition mode.

In the blind-addition mode, the 4G eNB 14 would simply proceed to add for the UE the 5G connection with the 5G gNB 16 without requiring as a condition precedent that the UE report being within threshold strong coverage of the 5G gNB 16. Whereas, in the threshold-based-addition mode, the 4G eNB 14 would require, as a condition precedent to adding that 5G connection for the UE, that the UE report being within threshold strong coverage of the 5G gNB 16.

Specifically with threshold-based-addition, for instance, the 4G eNB 14 could transmit to the UE (e.g., in an RRC message) a B1 (inter-RAT) measurement object that directs the UE to scan for coverage of the 5G gNB 16 and/or of one or more carriers on which the 5G gNB 16 operates, and that designates at least one B1 measurement threshold. The B1 measurement threshold could be a minimum threshold level of reference signal receive power (RSRP) and/or reference signal receive quality (RSRQ) that the UE has from the 5G gNB 16 as a condition for the UE providing a B1 measurement report to the 4G eNB 14. For instance, the B1 measurement threshold could be RSRP on the order of at least −116 dBm to −95 dBm.

In line with the discussion above, the 4G eNB 14 could select which of at least these two modes to operate in, with the selection being based at least on what type of UE the UE is. Here, the type of the UE could be defined in various ways and might be indicated by signaling from the UE and/or by an in-network profile record for the UE, among other possibilities. Examples of types that could form the basis for the selection between blind-addition and threshold-based addition include (i) whether the UE is a standard-power UE or rather a high-power UE that could transmit with higher transmission power, (ii) whether the UE supports carrier aggregation or not, (iii) whether the UE supports certain forms of MIMO communication or not, and (iv) whether the UE is a relay-UE or rather an end-user UE, among other possibilities.

As to the example of whether the UE is a relay-UE or rather an end-user UE, the 4G eNB 14 could make the determination of the UE's type based on signaling and/or information as discussed above. For instance, the 4G eNB 14 could determine if the UE is a relay-UE or rather an end-user UE based on whether or not signaling from the UE indicates that the UE is a relay-UE and/or based on other information that indicates whether the UE is a relay-UE or rather an end-user UE.

If the 4G eNB 14 determines that the UE is an end-user UE rather than a relay-UE, as would be the case with UE 40 discussed above, then, based at least on that determination, the 4G eNB 14 could apply the blind-addition process rather than the threshold-based-addition process. Thus, in that case, the 4G eNB 14 could proceed directly with the SgNB-addition process to add for the UE a secondary connection with the 5G gNB 16, without requiring as a condition precedent (for so proceeding with the SgNB-addition process) that that the UE report being within threshold strong coverage of the 5G gNB 16.

Whereas, if the 4G eNB 14 determines that the UE is a relay-UE rather than an end-user UE, as would be the case with UE 42 discussed above, then, based at least on that determination, the 4G eNB 14 could apply the threshold-based-addition process rather than the blind-addition process. Thus, in that case, the 4G eNB 14 could provide the UE 34 with a B1 measurement object and, if and when the 4G eNB 14 receives from the UE 34 an associated B1 measurement report indicating that the UE is within threshold strong coverage of the 5G gNB 16, the 4G eNB could then proceed with the SgNB-addition process to add for the UE a secondary connection with the 5G gNB 16.

In an example implementation, for instance, the 4G eNB 14 might operate by default in the blind-addition mode when working to add for a UE a secondary connection with the 5G gNB 16. However, if the 4G eNB 14 determines that the UE is a particular type of UE, such as that the UE is a relay-UE rather than an end-user UE in the example above, then, based at least on that determination, the 4G eNB 14 could operate in the threshold-based-addition mode rather than the blind-addition mode. Other analogous examples could be possible as well.

Figure 2:
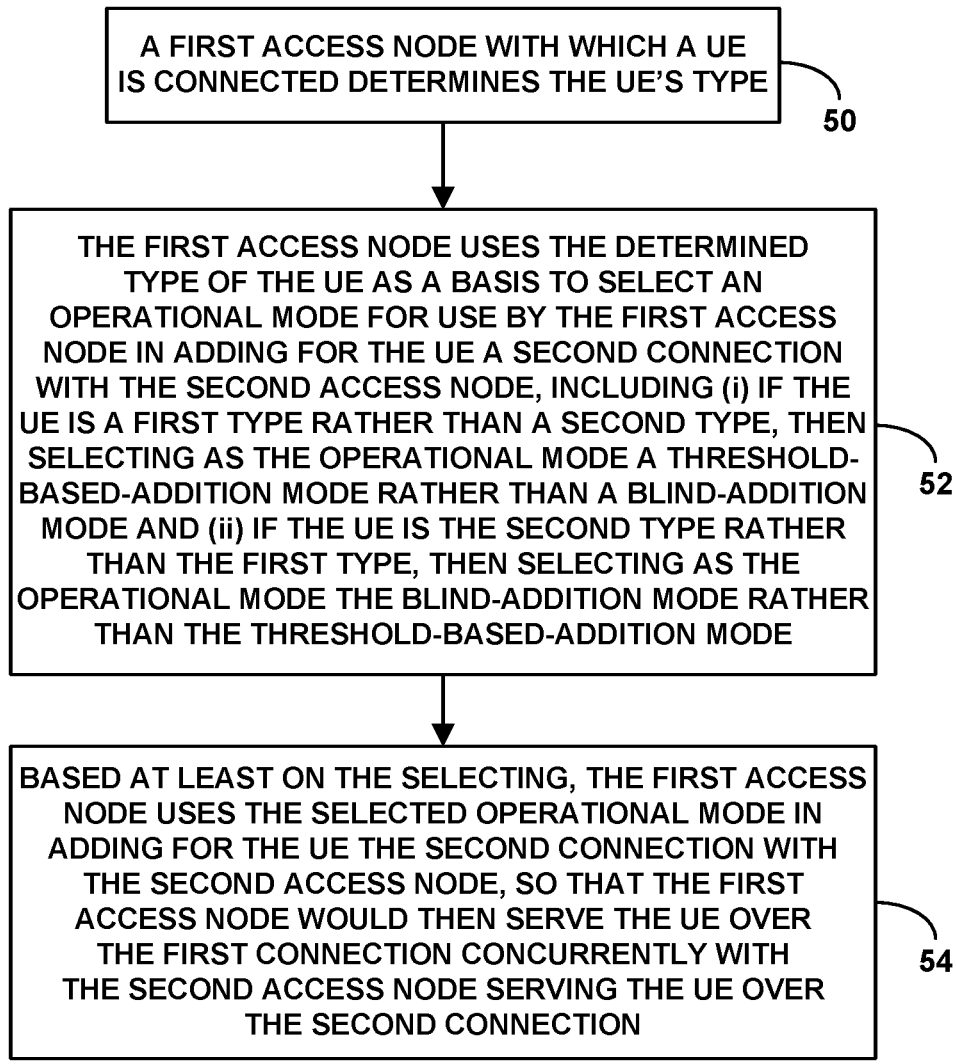
FIG. 2 is a flow chart depicting an example method in accordance with the disclosure.

FIG. 2 is a flow chart depicting an example method that can be carried out to control configuration of dual connectivity for a UE, the UE being of a particular type. This method could be carried out by or for a first access node with which the UE currently has a first connection, such as by 4G eNB 14 when the UE is connected with 4G eNB 14 for instance.

As shown in FIG. 2, at block 50, the method includes the first access node determining the UE's type, perhaps based on signaling from the UE. And at block 52, the method includes the first access node using the determined type of the UE as a basis to select an operational mode for use by the first access node in adding for the UE a second connection with the second access node, including (i) if the determined is a first type rather than a second type, then selecting as the operational mode a threshold-based-addition mode rather than a blind-addition mode and (ii) if the determined type is the second type rather than the first type, then selecting as the operational mode the blind-addition mode rather than the threshold-based-addition mode. At block 54, the method then includes, based at least on the selecting, the first access node using the selected operational mode in adding for the UE the second connection with the second access node, so that the first access node would then serve the UE over the first connection concurrently with the second access node serving the UE over the second connection.

In line with the discussion above, the act of using the blind-addition mode in adding for the UE the second connection with the second access node could involve adding for the UE the second connection with the second access node without requiring, as a condition precedent, the UE reporting being within threshold strong coverage of the second access node. Whereas, using the threshold-based-addition mode in adding for the UE the second connection with the second access node could involve adding for the UE the second connection with the second access node contingent on the UE reporting being within threshold strong coverage of the second access node.

Further, the act of the UE reporting being within threshold strong coverage of the second access node could involve the UE transmitting to the first access node a measurement report indicating that the UE is within threshold strong coverage of the second access node. For instance, the first connection could be according to a first RAT (e.g., 4G LTE), the second connection could be according to a second RAT (e.g., 4G NR), the dual connectivity could be EN-DC, and the measurement report could be a B1 measurement report.

Still further, as discussed above, the first and second types could take various forms. For instance, the first type could be a UE that operates to provide connectivity for one or more other UEs, and the second type could be a UE that does not operate to provide connectivity for one or more other UEs. By way of example, the first type could be a relay-UE, which could provide connectivity for at least one relay access node that operates to serve one or more end-user UEs, and the second type could be an end-user UE.

Figure 3:
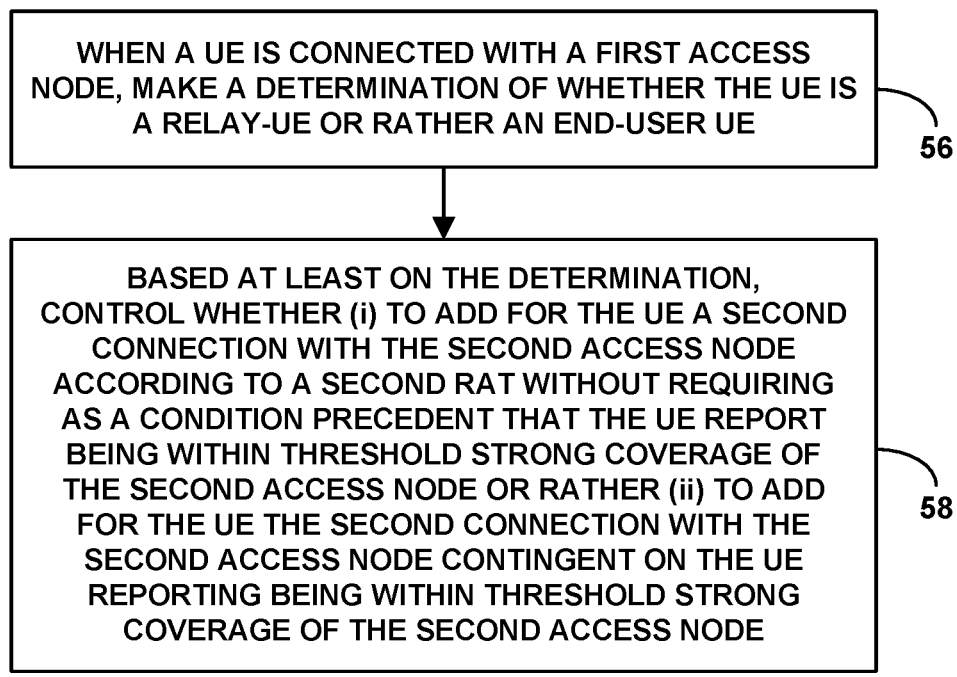
FIG. 3 is another flow chart depicting an example method in accordance with the disclosure.

FIG. 3 is next a flow chart depicting an example method that can be carried out to control configuration of dual connectivity for a UE that has a first connection with a first access node in accordance with a first RAT. This method could be carried out by the first access node, and/or by one or more other entities.

As shown in FIG. 3, at block 56, the method includes making a determination of whether the UE is relay-UE or rather an end-user UE. And at block 58, the method includes, based on the determination, controlling whether (i) to add for the UE a second connection with the second access node according to a second RAT without requiring as a condition precedent that the UE report being within threshold strong coverage of the second access node or rather (ii) to add for the UE the second connection with the second access node contingent on the UE reporting being within threshold strong coverage of the second access node.

Various features described above can be implemented in this context as well, and vice versa.

For example, the act of controlling based on the determination, whether (i) to add for the UE the second connection with the second access node without requiring as a condition precedent that the UE report being within threshold strong coverage of the second access node or rather (ii) to add for the UE the second connection with the second access node contingent on the UE reporting being within threshold strong coverage of the second access node could involve (a) if the determination is that the UE is an end-user UE rather than a UE-relay, then, based at least in part on the determination, engaging in a process to add for the UE the second connection with the second access node without requiring as a condition precedent that the UE report being within threshold strong coverage of the second access node, whereas (b) if the determination is that the UE is relay-UE rather than an end-user UE, then, based at least in part on the determination, engaging in the process to add for the UE the second connection with the second access node only upon receiving from the UE a report of the UE being in threshold strong coverage of the second access node.

Further, the act of controlling, based on the determination, whether (i) to add for the UE the second connection with the second access node without requiring as a condition precedent that the UE report being within threshold strong coverage of the second access node or rather (ii) to add for the UE the second connection with the second access node contingent on the UE reporting being within threshold strong coverage of the second access node could additionally involve, responsive to the determination being that the UE is a UE-relay rather than an end-user UE, transmitting to the UE a measurement object that causes the UE to scan for coverage of the second access node and to transmit to the first access node a measurement report if and when the coverage of the second access node is at least as strong as a predefined coverage-strength threshold. For instance, if the first access node operates under a first RAT and the second access node operates under a second RAT, then measurement object could be a B1 measurement object that causes the UE to scan for coverage under the second RAT and provide a B1 measurement report if and when the UE detects threshold strong coverage under the second RAT.

Figure 4:
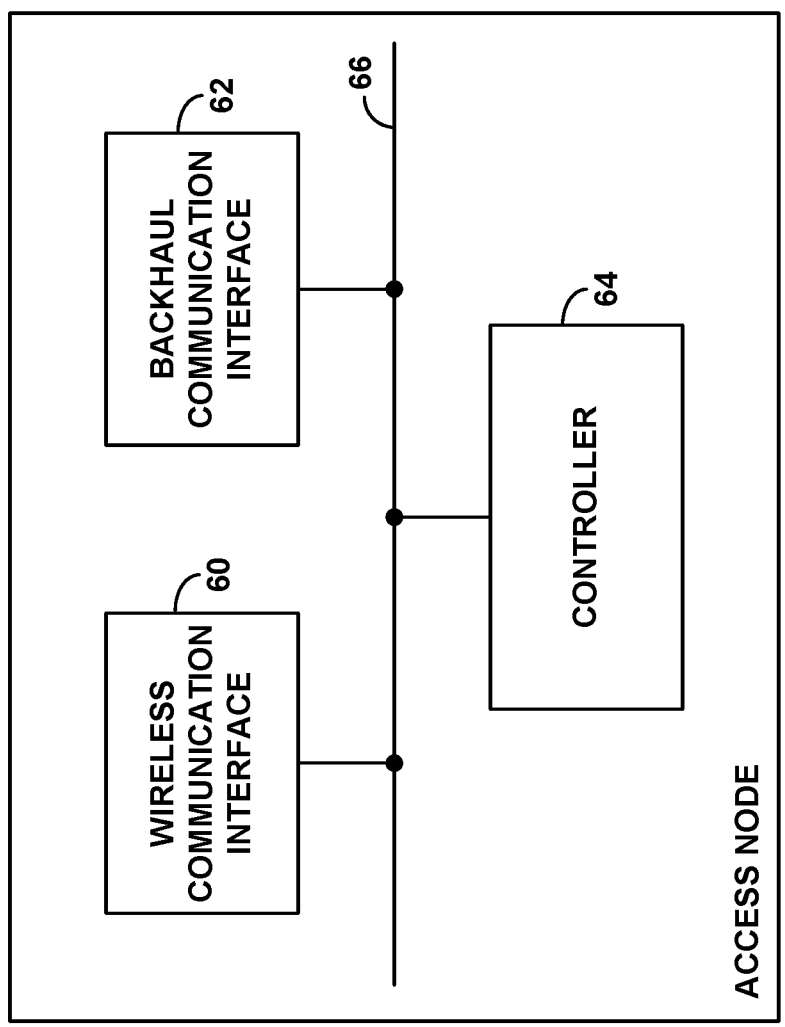
FIG. 4 is a simplified block diagram of an example access node operable in accordance with the disclosure.

FIG. 4 is a simplified block diagram of an example first access node, such as 4G eNB 14, showing some of the components that could be included in the access node in a non-limiting example implementation. As shown, the example first access node includes a wireless communication interface 60, a backhaul communication interface 62, and a controller 64, which could be integrated together in various ways (e.g., on a chipset) and/or interconnected by a system bus, network, or other communication mechanism 66 as shown.

The wireless communication interface 60 could include a radio and antenna structure through which the first access node could be configured to engage in air-interface communication and serve UEs according to a first RAT. And the backhaul communication interface 62 could comprise a wired or wireless network communication module, such as an Ethernet interface, through which to communicate with other entities, perhaps with the second access node and/or with one or more other entities on or via a core network.

Further, the controller 64 could comprise a processing unit (e.g., one or more processing units such as microprocessors and/or specialized processors), non-transitory data storage (e.g., one or more volatile and/or non-volatile storage components, such as magnetic, optical, or flash storage), and program instructions stored in the data storage and executable by the processing unit to carry out, or cause the first access node to carry out, various operations as described herein.

Various features discussed above can be implemented in this context as well, and vice versa.

For instance, the controller could be configured to control configuration of dual connectivity of a UE when the UE has a first connection with the first access node in accordance with the first RAT, such as by making a determination of whether the UE is a relay-UE or rather an end-user UE, and, based at least on the determination, controlling whether to require, as a condition precedent to adding for the UE a second connection with the second access node according to a second RAT, that the UE report being within threshold strong coverage of the second access node.

In line with the discussion above, the act of controlling, based on the determination, whether to require, as the condition precedent to adding for the UE the second connection with the second access node, that the UE report being within threshold strong coverage of the second access node could involve requiring, as the condition precedent to adding for the UE a second connection with the second access node according to a second RAT, that the UE report being within threshold strong coverage of the second access node, with the requiring occurring if and only if the determination is that the UE is a relay-UE.

Further, as discussed above, the act of requiring, as the condition precedent to adding for the UE a second connection with the second access node according to a second RAT, that the UE report being within threshold strong coverage of the second access node could involve transmitting to the UE a measurement object that causes the UE to scan for coverage of the second access node and to transmit to the first access node a measurement report with the transmitting of the measurement report occurring if and when the UE determines that the coverage of the second access node is at least as strong as a predefined coverage-strength threshold.

The present disclosure also contemplates a non-transitory computer-readable medium having encoded thereon (e.g., storing, embodying, containing, or otherwise incorporating) program instructions executable to cause a processing unit to carry out operations such as those described above.

Further, while the foregoing focuses on dual connectivity defined as involving service concurrently on two or more different RATs, the features described could extend as well to apply with respect to a single RAT, such as where a UE is connected with a first access node under a given RAT and at issue is adding for the UE of a second connection under the same RAT with a second access node to facilitate having the UE be served concurrently by both access nodes under that RAT.

Exemplary embodiments have been described above. Those skilled in the art will understand, however, that changes and modifications may be made to these embodiments without departing from the true scope and spirit of the invention.

We claim:

1. A method for controlling configuration of dual connectivity for a user equipment device (UE), wherein the UE is a type of UE, the method comprising:
  determining, by a first access node with which the UE currently has a first connection, the type of the UE;
  using, by the first access node, the determined type of the UE as a basis to select an operational mode for use by the first access node in adding for the UE a second connection with the second access node, including (i) if the determined type is a first type rather than a second type, then selecting as the operational mode a threshold-based-addition mode rather than a blind-addition mode and (ii) if the determined is the second type rather than the first type, then selecting as the operational mode the blind-addition mode rather than the threshold-based-addition mode; and
  based at least on the selecting, using by the first access node the selected operational mode in adding for the UE the second connection with the second access node, wherein the first access node then serves the UE over the first connection concurrently with the second access node serving the UE over the second connection,
  wherein using the blind-addition mode in adding for the UE the second connection with the second access node comprises adding for the UE the second connection with the second access node without requiring, as a condition precedent, the UE reporting being within threshold strong coverage of the second access node, and
  wherein using the threshold-based-addition mode in adding for the UE the second connection with the second access node comprises adding for the UE the second connection with the second access node contingent on the UE reporting being within threshold strong coverage of the second access node.

2. The method of claim 1, wherein the UE reporting being within threshold strong coverage of the second access node comprises the UE transmitting to the first access node a measurement report indicating that the UE is within threshold strong coverage of the second access node.

3. The method of claim 2, wherein the first connection is according to a first radio access technology (RAT), the second connection is according to a second RAT, and the measurement report comprises a B1 measurement report.

4. The method of claim 3, wherein the first RAT is 4G LTE, wherein the second RAT is 5G NR, and wherein the dual connectivity is EUTRA-NR dual connectivity (EN-DC).

5. The method of claim 1, wherein the first type is a UE that operates to provide connectivity for one or more other UEs, and wherein the second type is a UE that does not operate to provide connectivity for one or more other UEs.

6. The method of claim 1, wherein the first type is a relay-UE and the second type is an end-user UE.

7. The method of claim 6, wherein the relay-UE operates to provide connectivity for at least one relay access node that operates to serve one or more end-user UEs.

8. The method of claim 1, wherein determining the type of the UE is based on signaling from the UE.

9. A method for controlling configuration of dual connectivity for a user equipment device (UE) that has a first connection with a first access node in accordance with a first radio access technology (RAT), the method comprising:
  making a determination of whether the UE is a relay-UE or rather an end-user UE; and
  based at least on the determination, controlling whether (i) to add for the UE a second connection with the second access node according to a second RAT without requiring as a condition precedent that the UE report being within threshold strong coverage of the second access node or rather (ii) to add for the UE the second connection with the second access node contingent on the UE reporting being within threshold strong coverage of the second access node,
  wherein the controlling includes (a) if the determination is that the UE is an end-user UE rather than a UE-relay, then, based at least in part on the determination, engaging in a process to add for the UE the second connection with the second access node without requiring as a condition precedent that the UE report being within threshold strong coverage of the second access node, and (b) if the determination is that the UE is relay-UE rather than an end-user UE, then, based at least in part on the determination, engaging in the process to add for the UE the second connection with the second access node only upon receiving from the UE a report of the UE being in threshold strong coverage of the second access node.

10. The method of claim 9, wherein the method is carried out by the first access node.

11. The method of claim 9, wherein the controlling further comprises:
  responsive to the determination being that the UE is a UE-relay rather than an end-user UE, transmitting to the UE a measurement object that causes the UE to scan for coverage of the second access node and to transmit to the first access node a measurement report if and when the coverage of the second access node is at least as strong as a predefined coverage-strength threshold.

12. The method of claim 11, wherein the measurement object is a B1 measurement object, and wherein the measurement report is a B1 measurement report.

13. A first access node comprising:
  a wireless communication interface through which the first access node is configured to engage in air-interface communication according to a first radio access technology (RAT);
  a backhaul communication interface; and
  a controller configured to control configuration of dual connectivity of a user equipment device (UE) when the UE has a first connection with the first access node in accordance with the first RAT, wherein the controller is configured to make a determination of whether the UE is a relay-UE or rather an end-user UE, and wherein the controller is configured to control, based at least on the determination, whether to require, as a condition precedent to adding for the UE a second connection with the second access node according to a second RAT, that the UE report being within threshold strong coverage of the second access node,
  wherein controlling, based at least on the determination, whether to require, as the condition precedent to adding for the UE the second connection with the second access node, that the UE report being within threshold strong coverage of the second access node comprises requiring, as the condition precedent to adding for the UE a second connection with the second access node according to a second RAT, that the UE report being within threshold strong coverage of the second access node, if and only if the determination is that the UE is a relay-UE.

14. The first access node of claim 13, wherein requiring, as the condition precedent to adding for the UE a second connection with the second access node according to a second RAT, that the UE report being within threshold strong coverage of the second access node comprises:
  transmitting to the UE a measurement object that causes the UE to scan for coverage under the second RAT and to transmit to the first access node a measurement report if and when the coverage under the second RAT is at least as strong as a predefined coverage-strength threshold.

15. The first access node of claim 13, wherein the first RAT is 4G LTE, wherein the second RAT is 5G NR, and wherein the dual-connectivity is EUTRA-NR dual connectivity (EN-DC).

16. The first access node of claim 13, wherein the controller is configured to make the determination of whether the UE is a relay-UE or rather an end-user UE based on signaling from the UE.

17. The first access node of claim 13, wherein the first access node is collocated with the second access node.

* * * * *